(12) United States Patent
Campbell et al.

(10) Patent No.: US 8,368,956 B2
(45) Date of Patent: Feb. 5, 2013

(54) METHODS AND SYSTEMS FOR SEGMENTING A DIGITAL IMAGE INTO REGIONS

(75) Inventors: Richard John Campbell, Camas, WA (US); Toyohisa Matsuda, Matsudo (JP); Lawrence Shao-hsien Chen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 6 days.

(21) Appl. No.: 12/982,718

(22) Filed: Dec. 30, 2010

(65) Prior Publication Data

US 2011/0096993 A1   Apr. 28, 2011

Related U.S. Application Data

(63) Continuation of application No. 11/424,297, filed on Jun. 15, 2006, now Pat. No. 7,864,365.

(51) Int. Cl.
*H04N 1/60* (2006.01)
(52) U.S. Cl. ....... 358/1.9; 358/3.01; 358/3.27; 382/168; 382/171; 382/172; 382/176; 382/180
(58) Field of Classification Search .......... None
See application file for complete search history.

(56) References Cited

U.S. PATENT DOCUMENTS

| | | | |
|---|---|---|---|
| 4,414,635 A | 11/1983 | Gast et al. | |
| 4,741,046 A | 4/1988 | Matsunawa et al. | |
| 4,805,023 A * | 2/1989 | Younse et al. | 348/247 |
| 5,001,767 A | 3/1991 | Yoneda et al. | |
| 5,034,988 A | 7/1991 | Fujiwara | |
| 5,157,740 A | 10/1992 | Klein et al. | |
| 5,265,173 A | 11/1993 | Griffin et al. | |
| 5,280,367 A | 1/1994 | Zuniga | |
| 5,293,430 A | 3/1994 | Shiau et al. | |
| 5,339,172 A | 8/1994 | Robinson | |
| 5,353,132 A | 10/1994 | Katsuma | |
| 5,379,130 A | 1/1995 | Wang et al. | |
| 5,481,622 A | 1/1996 | Gerhardt et al. | |
| 5,546,474 A | 8/1996 | Zuniga | |
| 5,581,667 A | 12/1996 | Bloomberg | |

(Continued)

FOREIGN PATENT DOCUMENTS

| JP | H06/152945 A | 5/1994 |
|---|---|---|
| JP | H07/107275 A | 4/1995 |

(Continued)

OTHER PUBLICATIONS

Jean Duong, Hubert Empotz and Ching Y. Suen, Extraction of Text Areas in Printed Document Images, ACM Symposium on Document Engineering, Nov. 9-10, 2001, pp. 157-164, Atlanta, GA USA.

(Continued)

*Primary Examiner* — Dung Tran
(74) *Attorney, Agent, or Firm* — Kristine Elizabeth Matthews; David C. Ripma

(57) ABSTRACT

Aspects of the present invention relate to methods and systems for segmenting a digital image into regions. A frequency-of-occurrence of image values may be determined excluding a portion of pixels in a digital image. An image value associated with a peak in the frequency-of-occurrence of image values may be identified and associated with an image label. Pixel locations may be labeled based on the associated labels and image values. Additionally, unreliable pixels may be determined and labeled based on the associated labels and image values, and an unreliable pixel may be assigned a label after multiple scan passes of a classification map.

14 Claims, 12 Drawing Sheets

U.S. PATENT DOCUMENTS

| | | | |
|---|---|---|---|
| 5,588,072 A | 12/1996 | Wang | |
| 5,642,137 A | 6/1997 | Kitazumi | |
| 5,649,025 A | 7/1997 | Revankar | |
| 5,682,249 A | 10/1997 | Harrington et al. | |
| 5,689,575 A | 11/1997 | Sako et al. | |
| 5,694,228 A * | 12/1997 | Peairs et al. | 358/538 |
| 5,696,842 A | 12/1997 | Shirasawa et al. | |
| 5,767,978 A | 6/1998 | Revankar et al. | |
| 5,768,403 A | 6/1998 | Suzuki et al. | |
| 5,778,092 A | 7/1998 | MacLeod et al. | |
| 5,809,167 A | 9/1998 | Al-Hussein | |
| 5,848,185 A | 12/1998 | Koga et al. | |
| 5,854,853 A | 12/1998 | Wang | |
| 5,867,277 A | 2/1999 | Melen et al. | |
| 5,900,953 A | 5/1999 | Bottou et al. | |
| 5,903,363 A | 5/1999 | Yaguchi et al. | |
| 5,917,945 A | 6/1999 | Cymbalski | |
| 5,923,775 A | 7/1999 | Snyder et al. | |
| 5,943,443 A | 8/1999 | Itonori et al. | |
| 5,946,420 A | 8/1999 | Noh | |
| 5,949,555 A | 9/1999 | Sakai et al. | |
| 5,956,468 A | 9/1999 | Ancin | |
| 5,960,104 A | 9/1999 | Conners et al. | |
| 5,987,171 A | 11/1999 | Wang | |
| 5,995,665 A | 11/1999 | Maeda | |
| 6,020,979 A | 2/2000 | Zeck et al. | |
| 6,084,984 A | 7/2000 | Ishikawa | |
| 6,175,427 B1 | 1/2001 | Lehmbeck et al. | |
| 6,175,650 B1 | 1/2001 | Sindhu et al. | |
| 6,178,260 B1 | 1/2001 | Li et al. | |
| 6,198,797 B1 | 3/2001 | Majima et al. | |
| 6,215,904 B1 | 4/2001 | Lavalle | |
| 6,222,932 B1 | 4/2001 | Rao et al. | |
| 6,233,353 B1 | 5/2001 | Danisewicz | |
| 6,246,791 B1 | 6/2001 | Kurzweil et al. | |
| 6,252,994 B1 | 6/2001 | Nafarieh | |
| 6,256,413 B1 | 7/2001 | Hirabayshi | |
| 6,272,240 B1 | 8/2001 | Li et al. | |
| 6,298,173 B1 | 10/2001 | Lopresti | |
| 6,301,381 B1 | 10/2001 | Hayashi | |
| 6,308,179 B1 | 10/2001 | Petersen et al. | |
| 6,347,153 B1 | 2/2002 | Triplette et al. | |
| 6,360,007 B1 | 3/2002 | Robinson et al. | |
| 6,360,009 B2 | 3/2002 | Li et al. | |
| 6,373,981 B1 | 4/2002 | de Queiroz et al. | |
| 6,389,164 B2 | 5/2002 | Li et al. | |
| 6,400,844 B1 | 6/2002 | Fan et al. | |
| 6,473,522 B1 | 10/2002 | Lienhart et al. | |
| 6,522,791 B2 | 2/2003 | Nagarajan | |
| 6,526,181 B1 | 2/2003 | Smith et al. | |
| 6,535,633 B1 | 3/2003 | Schweid et al. | |
| 6,577,762 B1 | 6/2003 | Seeger et al. | |
| 6,594,401 B1 | 7/2003 | Metcalfe et al. | |
| 6,661,907 B2 | 12/2003 | Ho et al. | |
| 6,668,080 B1 | 12/2003 | Torr et al. | |
| 6,718,059 B1 | 4/2004 | Uchida | |
| 6,728,391 B1 | 4/2004 | Wu et al. | |
| 6,728,399 B1 | 4/2004 | Doll | |
| 6,731,789 B1 | 5/2004 | Tojo | |
| 6,731,800 B1 | 5/2004 | Barthel et al. | |
| 6,766,053 B2 | 7/2004 | Fan et al. | |
| 6,778,291 B1 * | 8/2004 | Clouthier | 358/1.16 |
| 6,782,129 B1 | 8/2004 | Li et al. | |
| 6,901,164 B2 | 5/2005 | Sheffer | |
| 6,950,114 B2 | 9/2005 | Honda et al. | |
| 6,993,185 B2 | 1/2006 | Guo et al. | |
| 7,020,332 B2 | 3/2006 | Nenonen et al. | |
| 7,027,647 B2 | 4/2006 | Mukherjee et al. | |
| 7,062,099 B2 | 6/2006 | Li et al. | |
| 7,079,687 B2 | 7/2006 | Guleryus | |
| 7,133,565 B2 | 11/2006 | Toda et al. | |
| 7,181,059 B2 | 2/2007 | Duvdevani et al. | |
| 7,190,409 B2 | 3/2007 | Yamazaki et al. | |
| 7,206,443 B1 | 4/2007 | Duvdevani et al. | |
| 7,221,805 B1 | 5/2007 | Bachelder | |
| 7,375,749 B2 * | 5/2008 | Hattori | 348/246 |
| 7,483,484 B2 | 1/2009 | Liu et al. | |
| 7,518,755 B2 | 4/2009 | Gotoh et al. | |
| 7,538,907 B2 | 5/2009 | Nagasaka | |
| 7,602,987 B2 * | 10/2009 | Kuramoto | 382/254 |
| 7,746,392 B2 * | 6/2010 | Hayaishi | 348/246 |
| 2001/0016077 A1 | 8/2001 | Oki | |
| 2001/0050785 A1 | 12/2001 | Yamazaki | |
| 2002/0027617 A1 | 3/2002 | Jeffers et al. | |
| 2002/0031268 A1 | 3/2002 | Prabhakar et al. | |
| 2002/0037100 A1 | 3/2002 | Toda et al. | |
| 2002/0064307 A1 | 5/2002 | Koga et al. | |
| 2002/0076103 A1 | 6/2002 | Lin et al. | |
| 2002/0106133 A1 * | 8/2002 | Edgar et al. | 382/261 |
| 2002/0110283 A1 | 8/2002 | Fan et al. | |
| 2002/0168105 A1 | 11/2002 | Li | |
| 2003/0086127 A1 | 5/2003 | Ito et al. | |
| 2003/0107753 A1 | 6/2003 | Sakamoto | |
| 2003/0133612 A1 | 7/2003 | Fan | |
| 2003/0133617 A1 | 7/2003 | Mukherjee | |
| 2003/0156760 A1 | 8/2003 | Navon et al. | |
| 2003/0228064 A1 | 12/2003 | Gindele et al. | |
| 2004/0001624 A1 | 1/2004 | Curry et al. | |
| 2004/0001634 A1 | 1/2004 | Mehrotra | |
| 2004/0042659 A1 | 3/2004 | Guo et al. | |
| 2004/0083916 A1 | 5/2004 | Isshiki | |
| 2004/0096102 A1 | 5/2004 | Handley | |
| 2004/0119856 A1 * | 6/2004 | Nishio et al. | 348/246 |
| 2004/0179742 A1 | 9/2004 | Li | |
| 2004/0190027 A1 | 9/2004 | Foster et al. | |
| 2004/0190028 A1 | 9/2004 | Foster et al. | |
| 2004/0205568 A1 | 10/2004 | Breuel et al. | |
| 2004/0240733 A1 | 12/2004 | Hobson et al. | |
| 2005/0008221 A1 | 1/2005 | Hull et al. | |
| 2005/0100219 A1 | 5/2005 | Berkner et al. | |
| 2005/0100220 A1 | 5/2005 | Keaton et al. | |
| 2005/0129310 A1 | 6/2005 | Herley | |
| 2005/0152616 A1 * | 7/2005 | Bailey | 382/275 |
| 2005/0163374 A1 | 7/2005 | Ferman et al. | |
| 2005/0174586 A1 | 8/2005 | Yoshida et al. | |
| 2005/0180647 A1 | 8/2005 | Curry et al. | |
| 2005/0219390 A1 * | 10/2005 | Tajima et al. | 348/246 |
| 2005/0248671 A1 * | 11/2005 | Schweng | 348/246 |
| 2005/0276510 A1 * | 12/2005 | Bosco et al. | 382/275 |
| 2005/0281474 A1 | 12/2005 | Huang | |
| 2005/0286758 A1 | 12/2005 | Zitnick et al. | |
| 2006/0072830 A1 | 4/2006 | Nagarajan et al. | |
| 2006/0133690 A1 | 6/2006 | Bloomberg et al. | |
| 2006/0153441 A1 | 7/2006 | Li | |
| 2006/0221090 A1 * | 10/2006 | Takeshima et al. | 345/582 |
| 2006/0229833 A1 | 10/2006 | Pisupati et al. | |
| 2006/0269159 A1 | 11/2006 | Kim et al. | |
| 2007/0291120 A1 | 12/2007 | Campbell et al. | |
| 2008/0123945 A1 | 5/2008 | Andrew et al. | |
| 2008/0212864 A1 | 9/2008 | Bornefalk | |
| 2008/0301767 A1 | 12/2008 | Picard et al. | |
| 2008/0310721 A1 | 12/2008 | Yang et al. | |

FOREIGN PATENT DOCUMENTS

| | | |
|---|---|---|
| JP | H08/065514 A | 3/1996 |
| JP | H09/186861 A | 7/1997 |
| JP | H09/204525 A | 8/1997 |
| JP | H09/251533 A | 9/1997 |
| JP | H11/213090 A | 6/1999 |
| JP | 2002/325182 A | 11/2002 |
| JP | 2003/008909 A | 1/2003 |
| JP | 2003/123072 A | 4/2003 |
| JP | 2003/303346 A | 10/2003 |
| JP | 2004/110606 A | 4/2004 |
| JP | 2005/159576 A | 6/2005 |
| JP | 2005/210650 A | 8/2005 |
| JP | 2005/353101 A | 12/2005 |
| JP | 2007/235953 A | 9/2007 |
| WO | 2005/067586 A2 | 7/2005 |
| WO | 2006/066325 A1 | 6/2006 |

OTHER PUBLICATIONS

Feng et al., "Exploring the Use of Conditional Random Field Models and HMMs for Historical Handwritten Document Recognition," DIAL'06, Apr. 2006, pp. 1-8, IEEE.

Richard Berry and Jim Burnell, "The histogram is a graph of pixel value versus the number of pixels having that value," 2000, pp. 1-3, from: www.willbell.com/AIP4Win_Updater/Histogram%20Tool.pdf.

Rainer Lienhart and Axel Wernicke, "Localizing and Segmenting Text in Images and Videos," IEEE Transactions on Circuits and Systems for Video Technology, Apr. 2002, pp. 256-268, vol. 12, No. 4, IEEE, USA.

U.S. Appl. No. 11/424,281—Office Action dated Jun. 9, 2009.
U.S. Appl. No. 11/424,296—Office Action dated Apr. 2, 2009.
U.S. Appl. No. 11/424,290—Office Action dated Nov. 27, 2007.
U.S. Appl. No. 11/424,290—Office Action dated May 28, 2008.
U.S. Appl. No. 11/424,290—Office Action dated Oct. 27, 2008.
U.S. Appl. No. 11/424,290—Supplemental Office Action dated Feb. 10, 2009.
U.S. Appl. No. 11/367,244—Office Action dated Mar. 30, 2009.
Japanese Patent Application No. 2007-229562—Office Action dated Mar. 3, 2009.
U.S. Appl. No. 11/424,290—Office Action dated Jul. 17, 2009.
U.S. Appl. No. 11/367,244—Office Action dated Nov. 3, 2009.
U.S. Appl. No. 11/424,281—Office Action dated Nov. 13, 2009.
U.S. Appl. No. 11/424,296—Office Action dated Oct. 28, 2009.
Japanese Patent Application No. 2007-035511—Office Action dated Jul. 21, 2009.
Japanese Patent Application No. 2007-035511—Office Action dated Dec. 15, 2009.
U.S. Appl. No. 11/367,244—Office Action dated Apr. 30, 2010.
U.S. Appl. No. 11/470,519—Office Action dated May 27, 2010.
U.S. Appl. No. 11/424,296—Office Action dated Apr. 16, 2010.
U.S. Appl. No. 11/424,290—Office Action dated Dec. 21, 2010.
U.S. Appl. No. 11/424,297—Office Action dated May 5, 2010.
U.S. Appl. No. 11/424,297—Office Action dated Oct. 22, 2009.
U.S. Appl. No. 11/424,297—Office Action dated Apr. 28, 2009.
U.S. Appl. No. 11/367,244—Notice of Allowance dated Oct. 7, 2010.
U.S. Appl. No. 11/470,519—Notice of Allowance dated Sep. 20, 2010.
U.S. Appl. No. 11/424,281—Notice of Allowance dated May 3, 2010.
U.S. Appl. No. 11/424,296—Office Action dated Jan. 20, 2011.
U.S. Appl. No. 11/424,290—Office Action dated Sep. 1, 2011.
Japanese Patent Application No. 2007-159364—Office Action dated Jan. 25, 2011.
Japanese Patent Application No. 2007-159363—Office Action dated Jan. 25, 2011.
U.S. Appl. No. 11/424,297—Notice of Allowance dated Sep. 1, 2010.
U.S. Appl. No. 11/424,296—Office Action dated Sep. 16, 2011.
USPTO Office Action—U.S. Appl. No. 11/424,296—Mailing Date Apr. 12, 2012.
USPTO Office Action—U.S. Appl. No. 11/424,290—Mailing Date Jun. 11, 2012.

* cited by examiner

|     | 141 |     |     |
| --- | --- | --- | --- |
| 144 | 140 | 142 |     |
|     | 143 |     |     |

FIG. 14a

| 145 | 146 | 147 |     |
| --- | --- | --- | --- |
| 148 | 140 |     |     |
|     |     |     |     |

FIG. 14b

|     |     |     |     |
| --- | --- | --- | --- |
|     | 140 | 152 |     |
| 151 | 150 | 149 |     |

FIG. 14c

|     |     |     |     |
| --- | --- | --- | --- |
| 156 | 140 |     |     |
| 153 | 154 | 155 |     |

FIG. 14d

| 159 | 158 | 157 |     |
| --- | --- | --- | --- |
|     | 140 | 160 |     |
|     |     |     |     |

FIG. 14e

METHODS AND SYSTEMS FOR SEGMENTING A DIGITAL IMAGE INTO REGIONS

CROSS REFERENCE TO RELATED APPLICATIONS

This application is a continuation of U.S. patent application Ser. No. 11/424,297, entitled "Methods and Systems for Segmenting a Digital Image into Regions," filed on Jun. 15, 2006 now U.S. Pat. No. 7,864,365, invented by Richard John Campbell, Toyohisa Matsuda and Lawrence Shao-hsien Chen, said application U.S. patent application Ser. No. 11/424,297 is hereby incorporated by reference herein, in its entirety.

FIELD OF THE INVENTION

Embodiments of the present invention comprise methods and systems for segmenting a digital image into regions.

BACKGROUND

Many digital image processing enhancements that improve the visual quality of a digital image rely on the accurate identification of different image regions in the digital image. Additionally, accurate detection of various regions in an image is critical in many compression processes.

SUMMARY

Embodiments of the present invention comprise systems and methods for segmenting a digital image into regions comprising selective application of an association between pixel values and image region labels.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 14a is a diagram of a target pixel and its four nearest neighbors;

FIG. 14b is a diagram of a target pixel and its four nearest, previously scanned neighbors for a top-left-to-bottom-right scan direction;

FIG. 14c is a diagram of a target pixel and its four nearest, previously scanned neighbors for a bottom-right-to-top-left scan direction;

FIG. 14d is a diagram of a target pixel and its four nearest, previously scanned neighbors for a bottom-left-to-top-right scan direction;

FIG. 14e is a diagram of a target pixel and its four nearest, previously scanned neighbors for a top-right-to-bottom-left scan direction.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention, but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Figure 1:
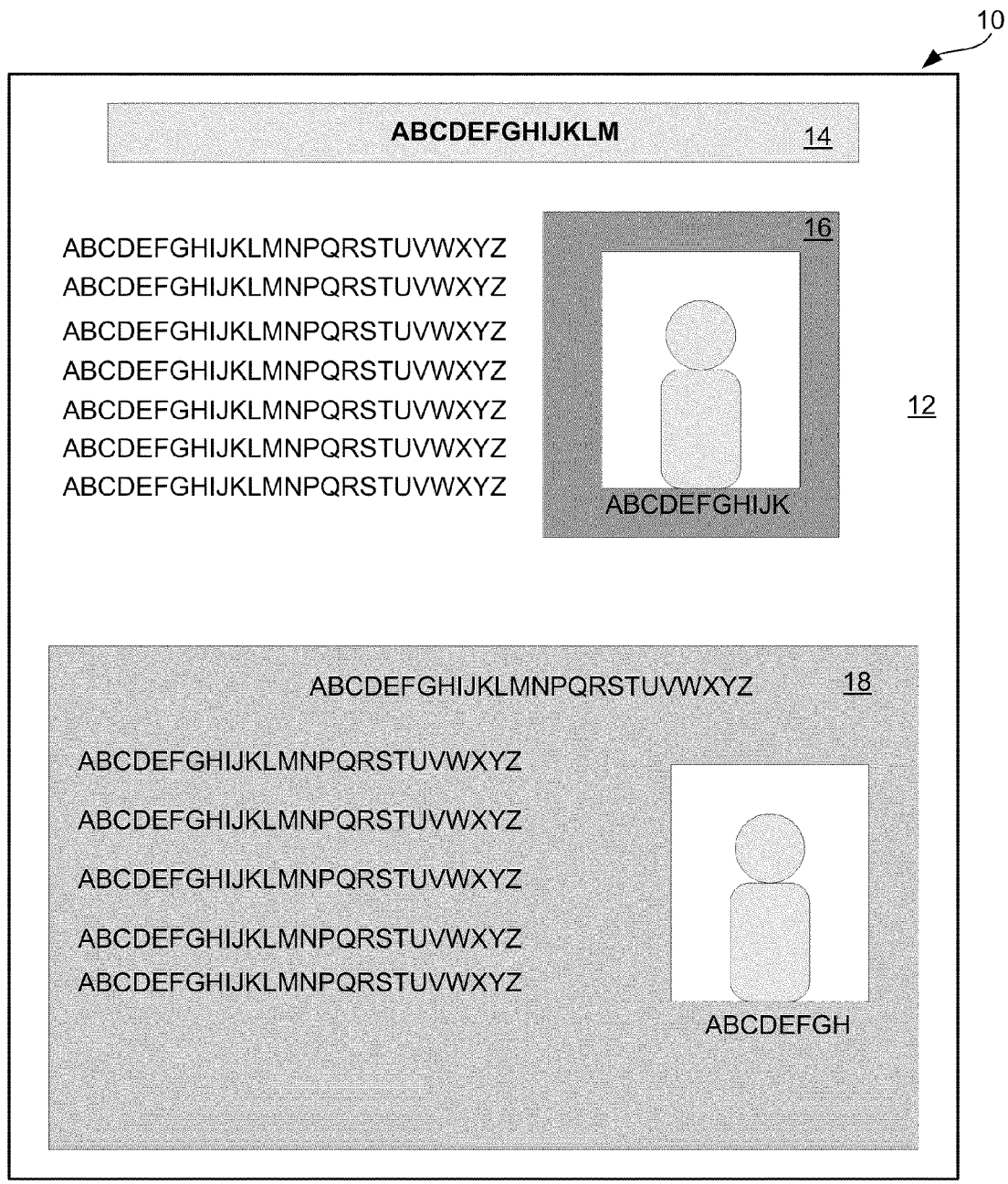
FIG. 1 depicts an exemplary digital image comprising a page background and three local background regions.

FIG. 1 shows an exemplary image 10. The image 10 is a document image comprising several regions including: a page background region 12 of a first uniform color, which may be the color of the paper on which the document is printed; a first local background region 14 of a second uniform color; a second local background region 16 of a third uniform color; and a third local background region 18 of a fourth uniform color. Due to imperfections in the printing and scanning processes, the pixels comprising an image region of uniform color, for example a local background region, may not have the same color value. The color values of the pixels may tend to form a small distribution around a central or peak color value. Embodiments of the present invention may assign, to pixels with color values in the small distribution, membership in a color class representing the uniform color in the image region.

Embodiments of the present invention comprise methods and systems for identifying a region of substantially uniform color in a digital image. In reference to an image region, the term "substantially uniform color" may refer to a region comprising exactly one color, a region comprising a plurality of colors that is perceived by a human viewer as a uniformly colored region, a region that is substantially one color, or perceived as one color, but containing a level of digital noise, a region comprising a plurality of colors that are close by a distance metric in a color space, or any other definition conveying a region of substantially uniform color as the term may be commonly used.

Embodiments of the present invention comprise determining a frequency-of-occurrence of color values in a digital image comprising pixels. In some embodiments, the color values may be represented in the same color space as that of the pixels in the digital image. In other embodiments, the color spaces may not be the same color space. Exemplary color spaces include, but are not limited to, RGB, sRGB, Lab, YUV, YCrCb, and LC. The quantization of the color spaces, whether the same color space or not, need not be the same. The dimension of the color spaces need not be the same.

Figure 2:
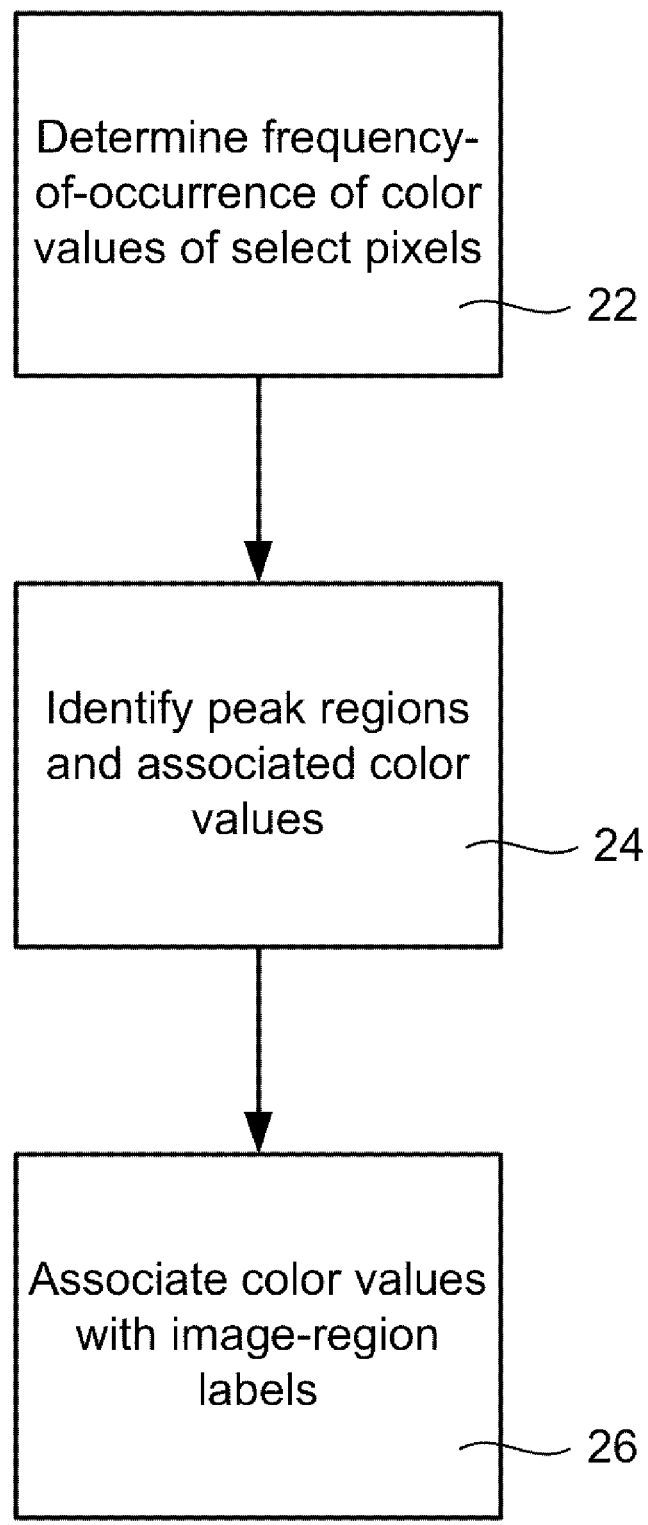
FIG. 2 is a diagram of embodiments of the present invention comprising determining the frequency-of-occurrence of select pixels in a digital image.

Some embodiments of the present invention shown in FIG. 2 comprise color analysis further comprising determining the frequency-of-occurrence of color values of select pixels in a digital image 22. Embodiments of the present invention shown in FIG. 2 further comprise identifying peak regions, and associated color values for each peak-region occurrence, in the frequency-of-occurrence of color values 24, and further associating an image-label with the color values associated with each peak region 26.

Figure 3:
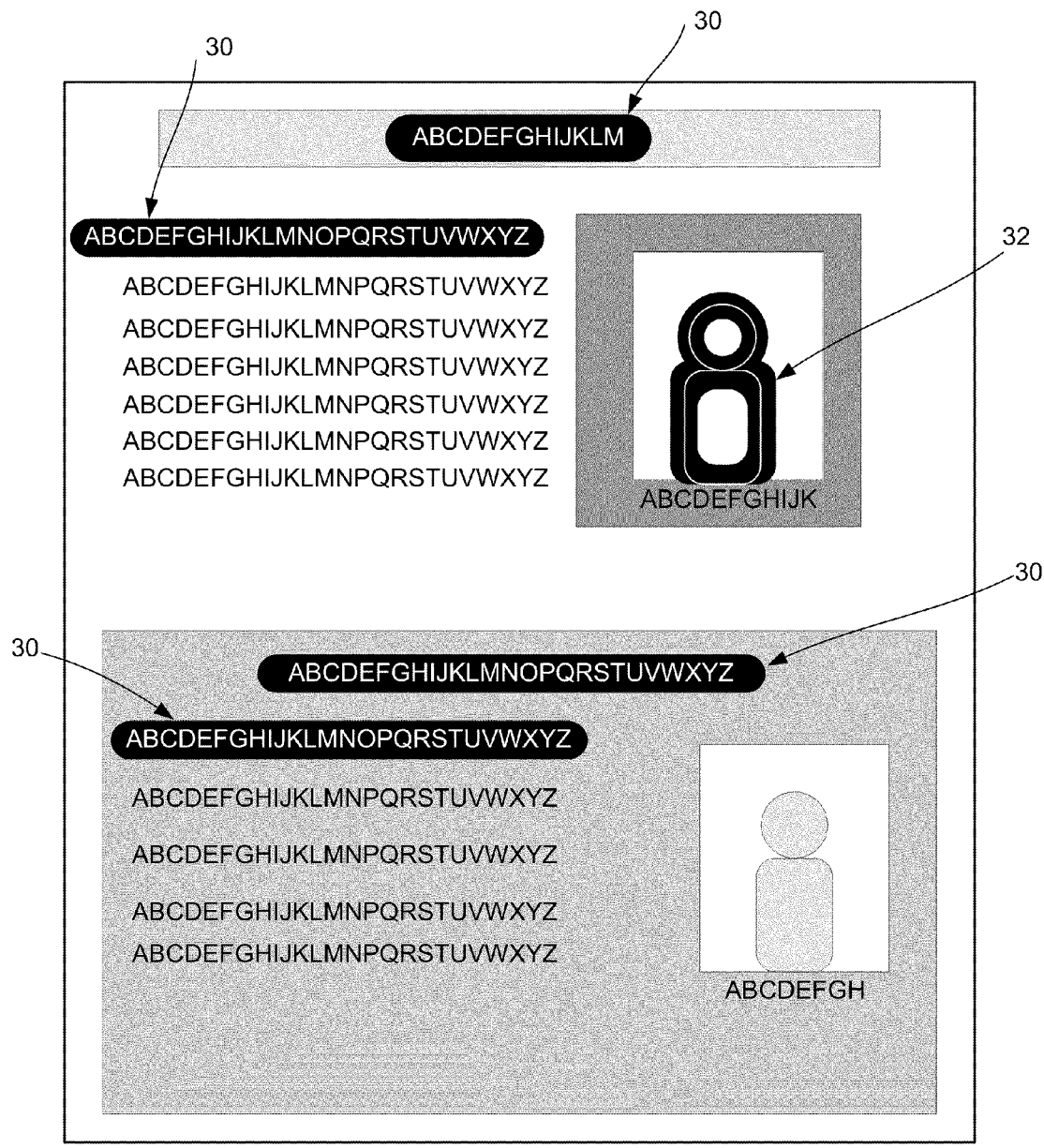
FIG. 3 depicts an exemplary digital image comprising select pixels surround text regions and transition regions in a picture.

Some embodiments of the present invention comprise identifying, in a digital image, regions of local background which may be substantially uniform in color. In these embodiments, regions of substantially uniform color in pictorial regions of the digital image may not be of interest, while regions of substantially uniform color surrounding text may be of interest. In these embodiments, determining the frequency-of-occurrence of color values may only consider the pixels surrounding text, considered select pixels. FIG. 3 shows select pixels 30 surrounding text for which the color analysis may be performed. In other embodiments, the select pixels may include pixels in the regions surrounding the edge of a figure in a pictorial region 32.

Figures 4, 5:
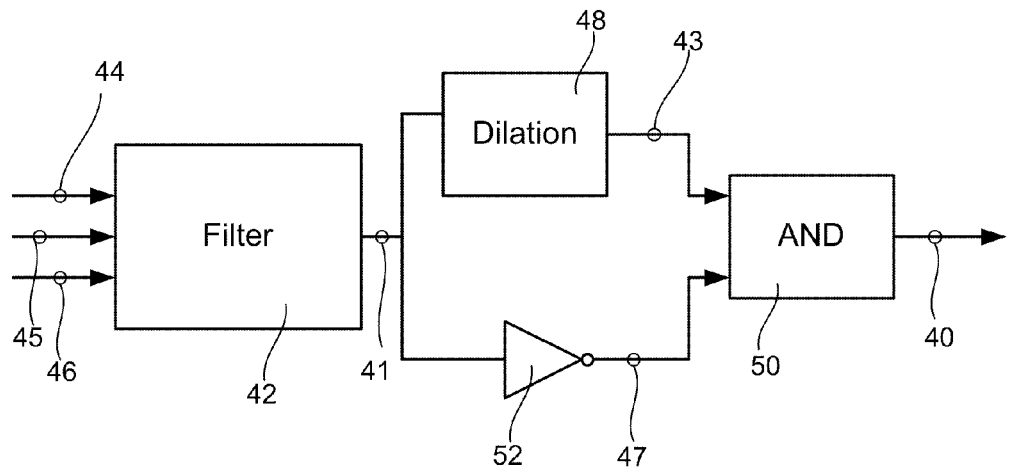
FIG. 4 is a diagram of embodiments of the present invention comprising a selection mask.
FIG. 5 is an exemplary 2-dimensional histogram in the form of an array.

In some embodiments of the present invention, the select pixels may be identified by a selection mask. FIG. 4 shows embodiments of the present invention comprising generating a selection mask 40. Determination of the selection mask 40 may comprise filtering 42 the digital image 45 based on image classification information 44, 46 determined from the digital image 45. In alternate embodiments, the classification information 44, 46 may be determined from an image corresponding to the digital image 45, for example a version of the digital image 45 at a different resolution. Image classification information may include identification of pixels that are portions of text 44, considered text candidates, in the digital image 45. Image classification information may include a pictorial measure 46 at pixels in the digital image 45. The filtering 42 may comprise combining the pictorial measure 46 and the text candidates 44 to remove text candidates that appear in pictorial regions of the digital image 45. The result 41 of the filter 42 may be pixels in the digital image that are text in nonpictorial regions of the digital image. The selection mask 40 may be determined by a dilation 48 of the text pixels 41 and a logical operation to remove the text pixels 41 from the dilation result 43. In the embodiments shown in FIG. 4, the logical operation comprises a logical-and operation 50 between the dilation result 43 and the result 47 of a logical-not operation 52 on the text pixels 41. Other embodiments may comprise other logical, mathematical, or other operations.

In some embodiments of the present invention, determining the frequency-of-occurrence of color values in a digital image may comprise generating a histogram. The histogram may be considered an array (also considered a matrix) in which the indices of the array correspond to the color values. The value of an entry in the array may correspond to the accumulated value of the number of select pixels in the digital image with a color value corresponding to the indices of the entry. FIG. 5 shows an exemplary histogram array 55 for a two-dimensional color space, for example an LC color space. In the exemplary LC color space, indices of the array may be, for example, L 56 and C 58 color values.

Figure 6:
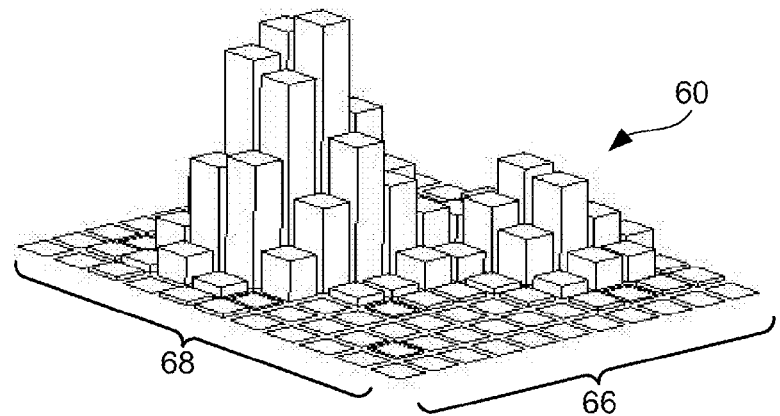
FIG. 6 is an exemplary 2-dimensional histogram in the form of a 3-dimensional plot.

A two-dimensional histogram may also be considered as a three-dimensional plot in which the height above each indexed location corresponds to the number of select pixels with color value corresponding to the index. FIG. 6 shows an exemplary three-dimensional plot 60 representing a two-dimensional histogram. In the exemplary LC color space, axes of the plot may be, for example, L 66 and C 68 color values.

In some embodiments of the present invention, identifying peak regions and associated color values for each peak-region occurrence in the frequency-of-occurrence of color values may comprise filtering the frequency-of-occurrence data. Filtering may comprise smoothing to retain the general shape of the peaks while removing small variations in data which may be due to noise and residual halftone screen frequencies. In some embodiments, the filtering may be performed independently in each dimension. In some embodiments, the support of the filtering may be different in each dimension. In some embodiments, the filter may be fixed. In alternate embodiments, the filter may be adaptive.

Figure 7:
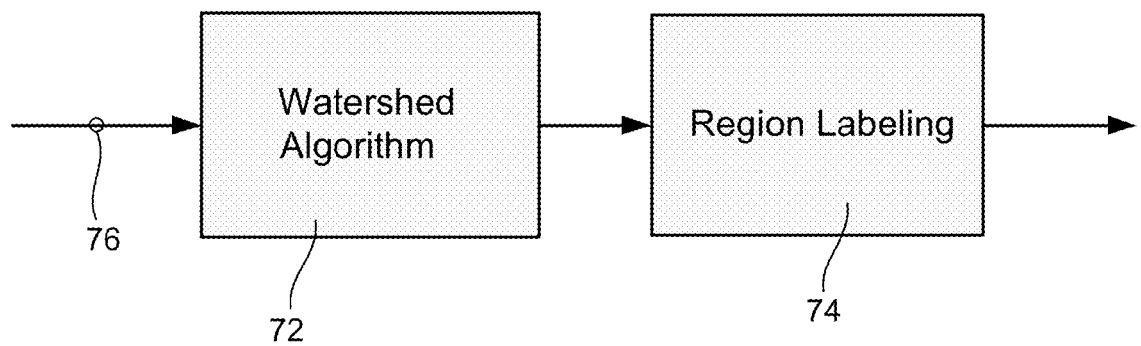
FIG. 7 is a diagram of embodiments of the present invention comprising a watershed algorithm.

Peak-region identification may comprise clustering techniques in some embodiments. In other embodiments, peak-region identification may comprise statistical techniques. In an exemplary embodiment, peak-region detection may comprise a watershed algorithm. An exemplary embodiment comprising the watershed algorithm is shown in FIG. 7. In alternate embodiments, peak-region identification may comprise filtering with connected component analysis and a distance transform. An exemplary embodiment is shown in FIG. 8.

In the embodiments shown in FIG. 7, a watershed algorithm 72 followed by region labeling 74 may be used to separate the boundaries between multiple color distributions described by a frequency-of-occurrence accumulation 76.

Figure 8:
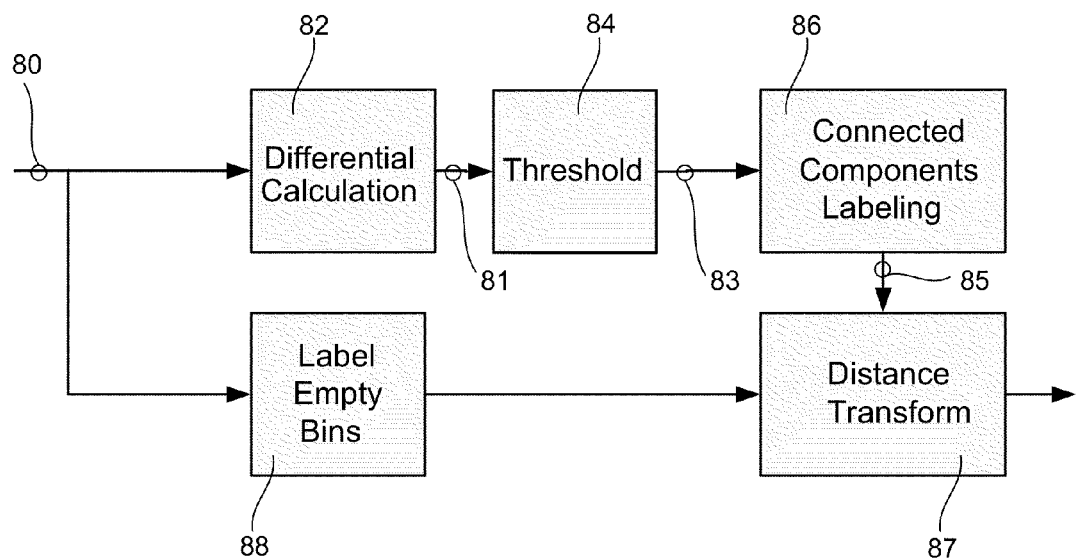
FIG. 8 is a diagram of embodiments of the present invention comprising a distance transform.

In the embodiments depicted by FIG. 8, a differential calculation 82 may be performed on a histogram 80, or other representation of the frequency-of-occurrence of color values of select pixels in an image. In some embodiments the differential calculation 82 comprises filtering the histogram data 80 with a differential filter. The differential filter may have a strong negative response to the transition from an empty bin to a nonempty bin. At and near a peak, the differential filter may have a strong positive response. An exemplary differential filter is a 3×3 Laplacian filter with kernel:

$$\begin{bmatrix} 0 & -1 & 0 \\ -1 & 4 & -1 \\ 0 & -1 & 0 \end{bmatrix}.$$

Other Laplacian filters include those with kernel:

$$\begin{bmatrix} -1 & -1 & -1 \\ -1 & 8 & -1 \\ -1 & -1 & -1 \end{bmatrix} \text{ or } \begin{bmatrix} 1 & -2 & 1 \\ -2 & 4 & -2 \\ 1 & -2 & 1 \end{bmatrix}.$$

A threshold operation 84 may be performed on the output 81 of the differential calculation 82. The threshold operation 84 may comprise identifying any histogram bin for which the difference calculation 81 is above the threshold as a peak seed 83. The threshold may be a single-value threshold in some embodiments of the present invention. In alternate embodiments, the threshold may be variable. Connected component labeling 86 in the plane of the histogram may generate labels for each peak seed region thereby producing labeled peak seed regions 85. Empty histogram bins may be assigned 88 a reserved label corresponding to a class indicating no occurrence of the color value for which the bin corresponds. Non-empty histogram bins which have not been labeled as a peak seed region may be assigned to a peak seed region using a distance transform operation 87. A bin may be assigned to the peak seed region to which the bin is closest in terms of a distance transform. The distance transform operation may also separate a contiguous region of bins containing two or more peak regions.

In some embodiments of the present invention, the distance transform may comprise a two-pass scanning method. In each pass, the distance, in the color space of the histogram, is the distance from an unassigned non-empty bin to the nearest peak region. In some embodiments, the first scan pass and the second scan pass may be in opposite directions. In some embodiments the distance may be measured as a city-block distance. In other embodiments, the distance may be measured as a Euclidean distance. Alternate distance measures may be used.

From the labeled regions in the frequency-of-occurrence data, an association between color values and image regions may be generated. In some embodiments, the association between color values and image regions may take the form of a color look-up-table. The color look-up-table may comprise indices corresponding to the dimensions of the color space in which the color values are represented, and the entry in the color look-up-table for particular indices may correspond to an image region label.

Figure 9:
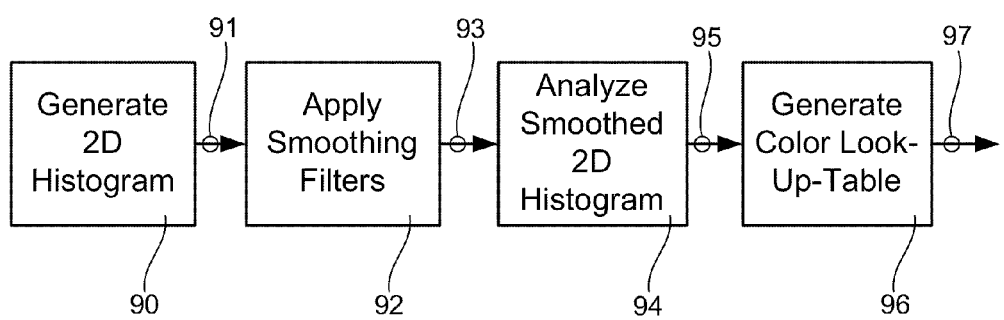
FIG. 9 is a diagram of embodiments of the present invention comprising generating a look-up-table.

An exemplary embodiment of the present invention, shown in FIG. 9, comprises generating 90 a two dimensional histogram 91, smoothing 92 the two dimensional histogram 91 thereby producing a smoothed histogram 93 in which the general shape of the peaks in the histogram may be preserved while isolated histogram bins with small accumulation may be removed, analyzing 94 the smoothed two dimensional histogram 93 to identify color values contributing to peaks in the smoothed two dimensional histogram 93, and generating 96 a color look-up-table 97 in which color values are mapped to image region labels.

The two dimensional histogram 91 may be formed by accumulating the number of pixels that contain a color value combination of luminance and chrominance values (LC values). The two dimensional histogram 91 may also be referred to as a LC histogram in an exemplary embodiment. In an exemplary embodiment, L may be quantized to 128 levels, and C may be quantized to 64 levels.

Not all pixels in the image may contribute to the LC histogram 91. In an exemplary embodiment, only pixels surrounding text candidates in non-pictorial regions of the image contribute to the LC histogram.

The LC histogram may be smoothed in each dimension using a one-dimensional smoothing filter. In the L dimension, the smoothing filter may be a 5×1 filter. An exemplary 5×1 smoothing filter is [1 4 6 4 1]. In the C dimension, the smoothing filter may be a 3×1 filter. An exemplary 3×1 smoothing filter is [1 2 1].

Figure 10:
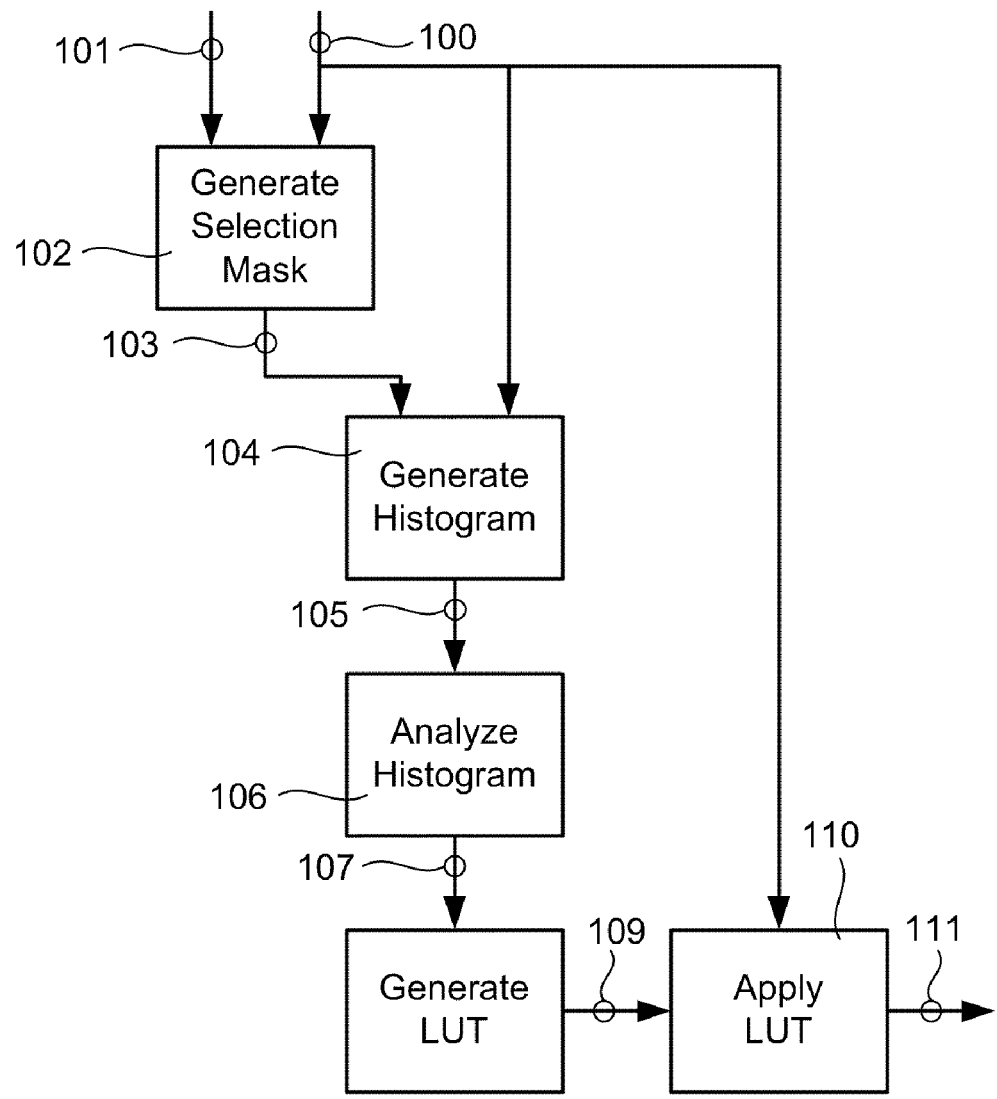
FIG. 10 is a diagram of embodiments of the present invention comprising application of a look-up-table.

In some embodiments of the present invention, local background regions may be detected in a digital image. FIG. 10 depicts embodiments of the present invention in which a digital image 100 and associated text detection results 101 may be combined to generate 102 a selection mask 103. A masked histogram 105 may be generated 104 in which only pixel values for pixels in the digital image 100 identified by the selection mask 103 are accumulated. The masked histogram 105 may be analyzed 106 to select peak regions 107 which may be used to generate 108 a look-up-table (LUT) 109 in which pixel values may be associated with a region identifier. The LUT 109 may be applied 110 to the digital image 100 generating a labeling 111 of regions in the digital image 100. Peak regions 107 may correspond to regions of substantially uniform color and local background.

Figure 11:
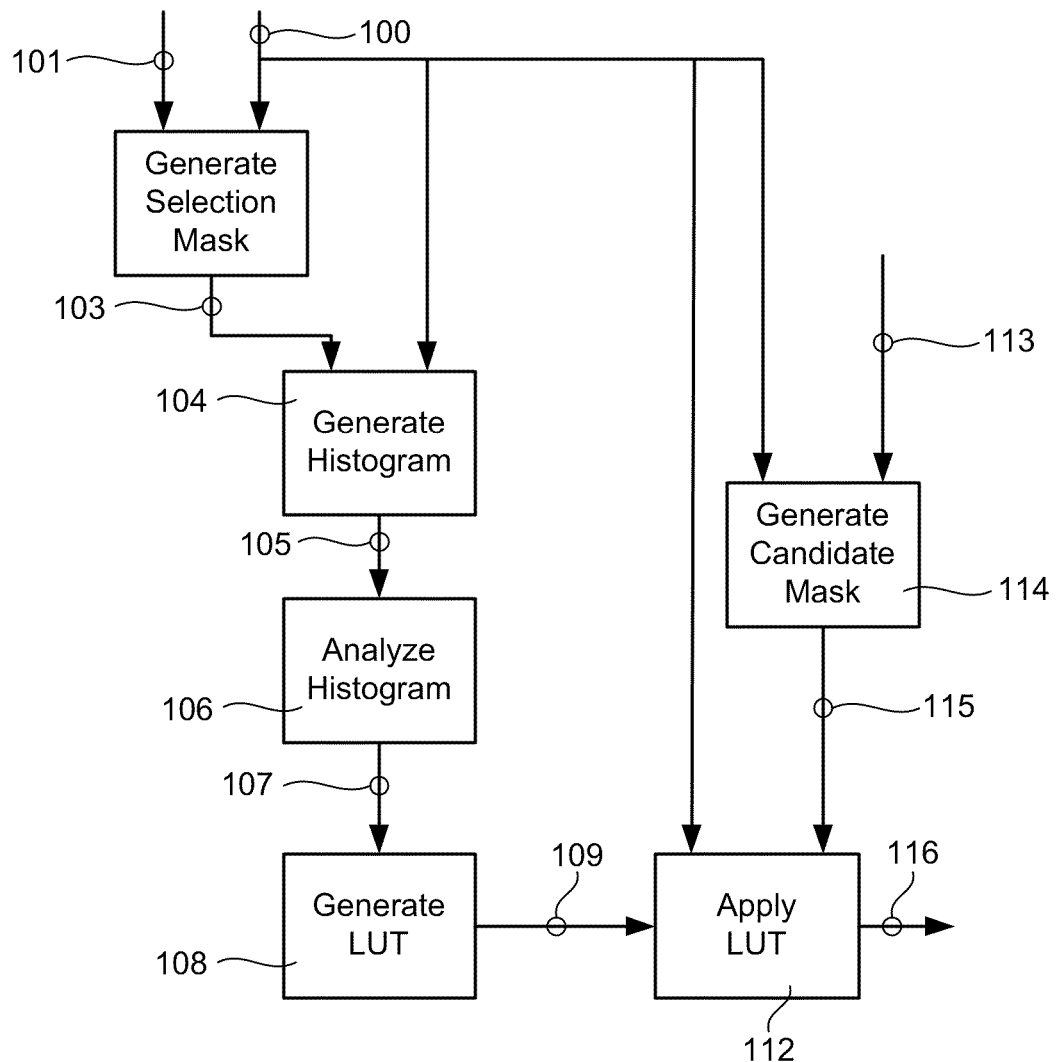
FIG. 11 is a diagram of embodiments of the present invention comprising selective application of a look-up-table.

In alternate embodiments, the LUT may be applied to local background candidates only, also referred to as reliable pixels. FIG. 11 shows embodiments of the present invention in which a candidate mask 115 may be generated 114 from the digital image 100 and support information 113. In some embodiments, the support information 113 may comprise text detection results, and the LUT may be selectively applied 112 to only non-text pixels. In alternate embodiments, the support information 113 may comprise a uniformity measure, and the candidate mask 115 may indicate which pixels in the digital image 100 are likely to be background pixels based on the uniformity measure. The LUT 109 may be applied selectively 112 to only the candidate pixels indicated by the candidate mask 115 generating a labeling 116 of background regions in the digital image 100. The LUT 109 may be generated as in the embodiments of the present invention shown in FIG. 10 in which a digital image 100 and associated text detection results 101 may be combined to generate 102 a selection mask 103. A masked histogram 105 may be generated 104 in which only pixel values for pixels in the digital image 100 identified by the selection mask 103 are accumulated. The masked histogram 105 may be analyzed 106 to select peak regions 107 which may be used to generate 108 a look-up-table (LUT) 109 in which pixel values may be associated with a region identifier.

In some embodiments of the present invention shown in FIG. 11, the uniformity information may be related to the variance of the luminance in a local window. If the variance is low, the pixel values may be nearly uniform. If the variance is high, the pixel values may be less uniform. In alternate embodiments, color distribution in a local window may be considered uniformity information. In some embodiments, the digital image 100 may be smoothed prior to extracting uniformity information.

Figure 12:
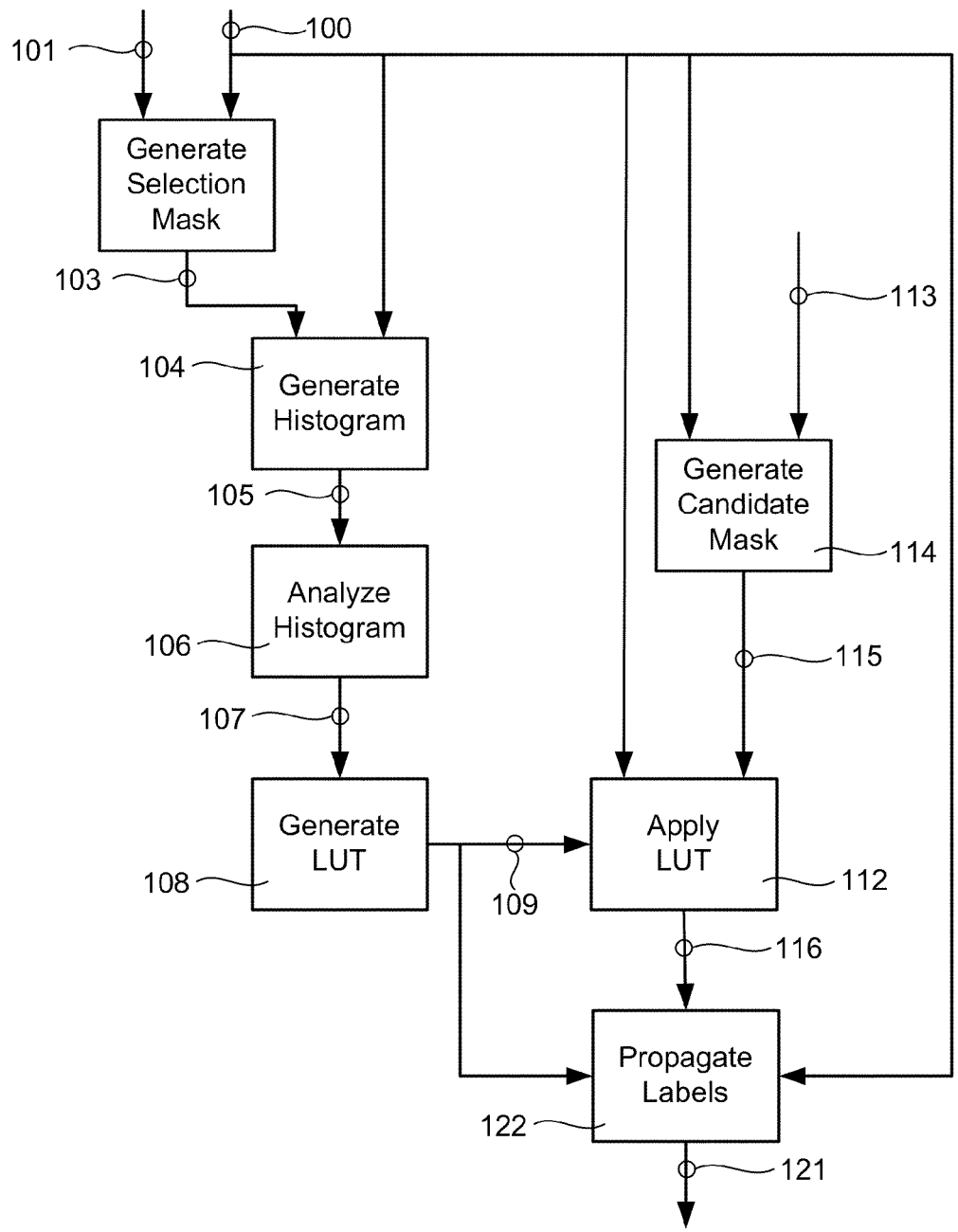
FIG. 12 is a diagram of embodiments of the present invention comprising propagation of region labels.
Figure 13:
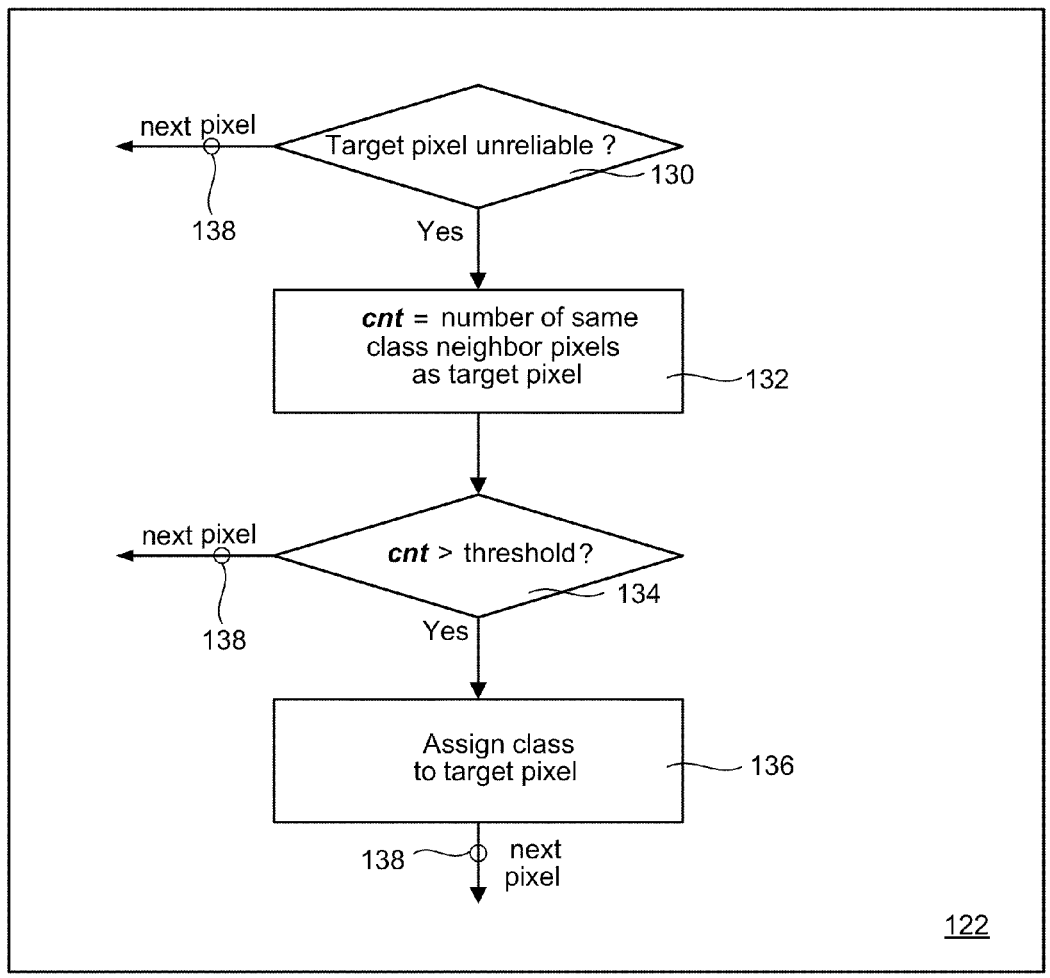
FIG. 13 is a diagram of embodiments of the present invention comprising a method for propagation of region labels.

In embodiments of the present invention shown in FIG. 12, the background labels 116 may be propagated 122 to those pixels in the digital image 100 not identified as candidate pixels by the process of candidate mask generation 114. After selectively applying 112 the LUT 109 to those pixels identified by candidate mask generation 114 as reliable pixels 115, the labels may be propagated 122 thereby producing a new classification map 121. The classification map 116 may be considered as seeds from which the class labels may be propagated based on the connectivity of neighboring pixels. FIG. 13 shows an embodiment of the present invention in which the labels are propagated based on the connectivity of four neighboring pixels.

In the embodiments shown in FIG. 13, each pixel location in the classification map may be examined 130 to determine if the target pixel is unreliable. If the target pixel is not unreliable, the next pixel may be examined 138. If the target pixel is unreliable, then the classes of the neighboring pixels may be examined 132. The class of the target, unreliable pixel, if it were to be assigned based on the LUT, may be compared to the class of the neighboring pixels. A count of the number of neighboring pixels of the same class as the target, unreliable pixel may be made 132. If the count is greater than a threshold, then the target pixel class may be set to the class assigned based on the LUT, and the next pixel may be examined 138. If the count is not great than a threshold, then the target pixel may be left as unassigned, and then the next pixel may be examined 138. In some embodiments, the threshold may be a majority count of the number of neighbors examined.

In some embodiments of the present invention, four neighboring pixels may be examined. The four pixels may be the four nearest-neighbor-pixels, shown in FIG. 14*a*. In FIG. 14*a*, the target pixel is pixel 140, and the four-nearest-neighbor pixels are 141, 142, 143, and 144. Alternatively, the four neighboring pixels may be the four nearest neighboring pixels that have already been scanned in a given scan direction, as shown in FIG. 14*b*, FIG. 14*c*, FIG. 14*d*, and FIG. 14*e*. In FIG. 14*b*, the scan direction is from the top-left to the bottom-right, and for target pixel 140, the four neighbors are 145, 146, 147, and 148. In FIG. 14*c*, the scan direction is from the bottom-right to the top-left, and for target pixel 140, the four neighbors are 149, 150, 151, and 152. In FIG. 14*d*, the scan direction is from bottom-left to top-right, and for target pixel 140, the four neighbors are 153, 154, 155, and 156. In FIG. 14*e*, the scan direction is from top-right to bottom-left, and for target pixel 140, the four neighbors are 157, 158, 159, and 160. In some embodiments in which four neighbors are examined, the threshold may be three or four.

In some embodiments the labels may be propagated in a single scan pass. In alternate embodiments, the labels may be propagated in multiple scan passes in different directions.

In some embodiments, detected local background regions may contain unassigned, also considered unreliable, pixels surrounded by those assigned to a background region. This may be due to text in the background region. Prior to image processing or compression or other processing of the region, it may be desired to assign a region label to these unassigned pixels. In some embodiments, an unreliable pixel may be assigned after multiple scan passes of the classification map. In some embodiments, four passes of the data may be made. The four passes may correspond to top-right-to-bottom-left, top-left-to-bottom-right, bottom-left-to-top-right, and bottom-right-to-top-left scan passes as shown in FIGS. 14*b*-14*e*.

Figure 15:
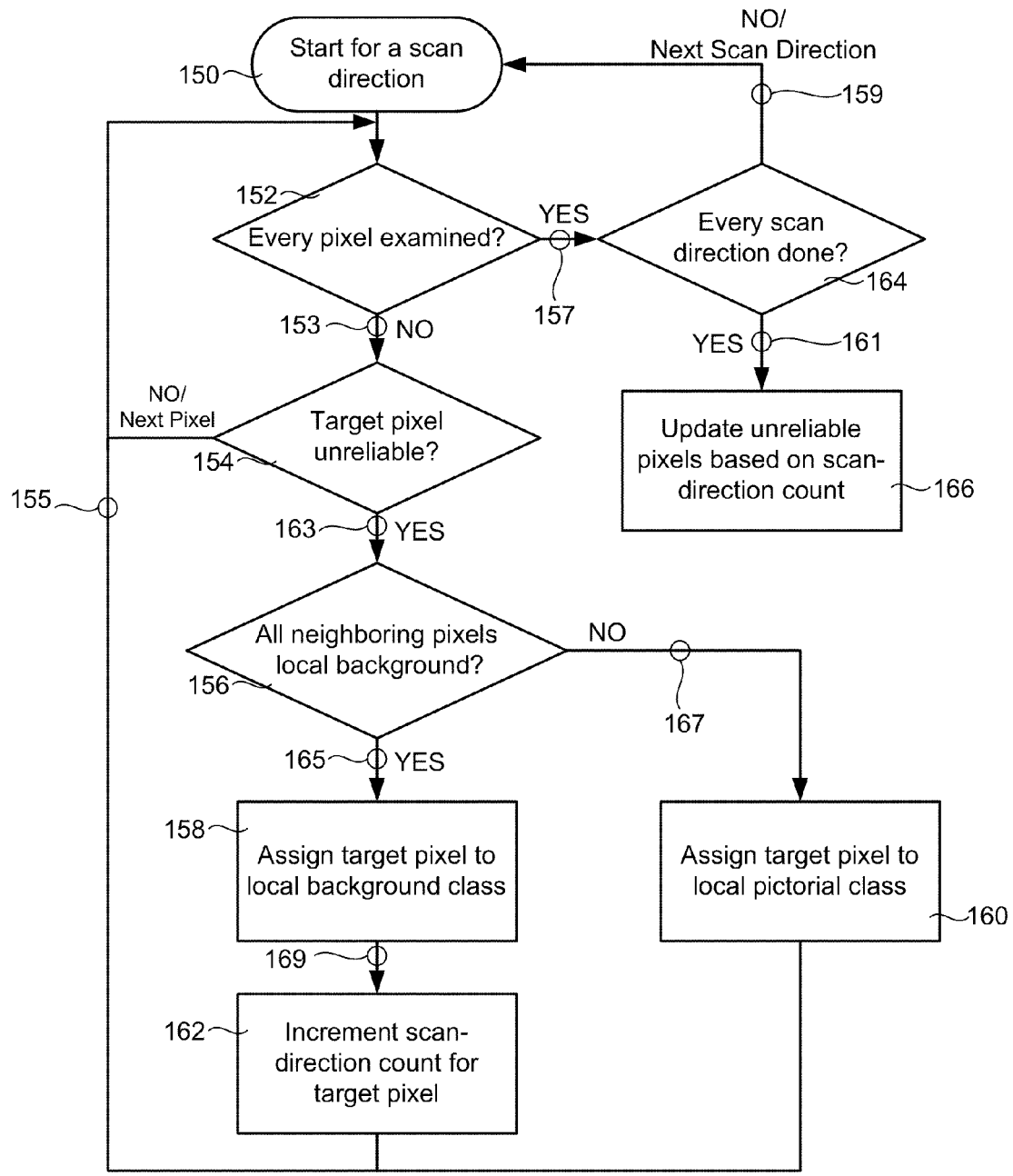
FIG. 15 is a diagram of embodiments of the present invention comprising assigning labels to unreliable target pixels.

Embodiments of the present invention shown in FIG. 15 may comprise scanning the classification map pixel-by-pixel multiple times. For a particular scan direction 150, it may be determined if every pixel in the classification map has been examined 152 in that scan pass. If a target pixel has not been examined 153, then it may be determined 154 if the target pixel is an unreliable pixel. If all pixels have been examined 157, then it may be determined if all scan passes have been completed 164. If all scan passes have not been completed 159, then the scan may be started for the next scan direction 150. If all scan passes are complete 161, then the unreliable pixels in the classification map may be updated 166. An unreliable pixel may be a pixel that was not considered to be a likely background candidate as in embodiments described previously.

If the target pixel is reliable 155, no further processing of the target pixel may need to be done, and the next pixel in the classification map may be examined 155. If the target pixel is unreliable 163, then the previously scanned neighboring pixels of the target pixel may be examined to determine if they belong to a local background region 156. If all of the previously scanned neighboring pixels belong to a local background region 165, then the target pixel may be assigned 158 to the local background class, and a scan-direction count for the target pixel may be incremented 162. The next pixel, if any unexamined pixels remain, may then be examined 155. If all of the previously scanned neighboring pixels are not local background 167, then the target pixel is assigned 160 to a local pictorial class, and the next pixel, if unexamined, may be examined 155.

After the classification map has been scanned in multiple scan directions 161, the unreliable pixels may be updated 166. A pixel classified as unreliable may be assigned a local background class if the scan-direction count for the pixel is greater than a threshold. In some embodiments of the present invention, the threshold may be a majority count of the number of scan passes. In other embodiments, the threshold may be equal to the number of scan passes. The threshold may be constant for all locations or adapted to pixel location in the classification map. If an unreliable pixel is updated to be local background, the pixel value of the pixel in the digital image may be examined. If the pixel value belongs to a local background class in the LUT, then this class may be assigned to the pixel. If it does not belong to a local background class in the LUT, the unreliable pixel may be assigned to a class considered unknown local background class.

In some embodiments of the present invention, the color values corresponding to empty histogram bins may be associated with a reserved class label indicating that a pixel of one of such color values may be a pictorial region candidate or a candidate for a uniformly colored region not considered a local background region. In some embodiments, uniformly colored regions not considered local background may be regions of uniform color with no text. In some embodiments of the present invention, the corresponding LUT entries may be associated with the pictorial candidate label or other uniform region label, respectively. In some embodiments, bins with a count smaller than a threshold may be treated as empty bins.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A non-transitory computer-readable medium encoded with a computer program code for a method for labeling an unlabeled pixel in a classification map, said method comprising:

performing a scan pass, of a classification map, in a first direction;

identifying, in said scan pass, an unreliable pixel in said classification map, wherein said unreliable pixel is a pixel, in said classification map, that is not assigned a region identifier associated with a local background image region;

incrementing a scan-direction count for said unreliable pixel if a condition related to a plurality of spatially neighboring pixels to said unreliable pixel is satisfied, wherein said plurality of spatially neighboring pixels includes only pixels previously scanned in said scan pass; and labeling said unreliable pixel based on said scan-direction count.

2. The method of claim 1, wherein said scan pass of said classification map is one of a plurality of scan passes of said classification map, wherein each scan pass in said plurality of scan passes of said classification map is performed in a different direction.

3. The method of claim 1, wherein said condition is related to the labels of said plurality of spatially neighboring pixels to said unreliable pixel.

4. The method of claim 3, wherein said plurality of neighboring pixels is associated with a four-nearest-neighbor neighborhood in relation to said unreliable pixel.

5. The method of claim 1 further comprising:
performing a second scan pass, of said classification map, in a second direction;
identifying, in said second scan pass, said unreliable pixel in said classification map; and
incrementing said scan-direction count for said unreliable pixel if a second condition related to a second plurality of spatially neighboring pixels to said unreliable pixel is satisfied, wherein said second plurality of spatially neighboring pixels includes only pixels previously scanned in said second scan pass.

6. The method of claim 5, wherein:
said condition is related to the labels of said plurality of spatially neighboring pixels to said unreliable pixel; and
said second condition is related to the labels of said second plurality of spatially neighboring pixels to said unreliable pixel.

7. The method of claim 5, wherein:
said plurality of spatially neighboring pixels is associated with a four-nearest-neighbor neighborhood in relation to said unreliable pixel; and
said second plurality of spatially neighboring pixels is associated with a second four-nearest-neighbor neighborhood in relation to said unreliable pixel.

8. A system for labeling an unlabeled pixel in a classification map, said system comprising:
in a computing system comprising at least one computing device, a classification-map scanner for performing a scan pass, of a classification map, in a first direction;
an unreliable-pixel identifier for identifying, in said scan pass, an unreliable pixel in said classification map, wherein said unreliable pixel is a pixel, in said classification map, that is not assigned a region identifier associated with a local background image region;
an incrementor for incrementing a scan-direction count for said unreliable pixel if a condition related to a plurality of spatially neighboring pixels to said unreliable pixel is satisfied, wherein said plurality of spatially neighboring pixels includes only pixels previously scanned in said scan pass; and
a labeler for labeling said unreliable pixel based on said scan-direction count.

9. The system of claim 8, wherein said scan pass of said classification map is one of a plurality of scan passes of said classification map, wherein each scan pass in said plurality of scan passes of said classification map is performed in a different direction.

10. The system of claim 8, wherein said condition is related to the labels of said plurality of spatially neighboring pixels to said unreliable pixel.

11. The system of claim 10, wherein said plurality of neighboring pixels is associated with a four-nearest-neighbor neighborhood in relation to said unreliable pixel.

12. The system of claim 8 further comprising:
a second classification-map scanner for performing a second scan pass, of said classification map, in a second direction;
a second unreliable-pixel identifier for identifying, in said second scan pass, said unreliable pixel in said classification map; and
wherein said incrementor further increments said scan-direction count for said unreliable pixel if a second condition related to a second plurality of spatially neighboring pixels to said unreliable pixel is satisfied, wherein said second plurality of spatially neighboring pixels includes only pixels previously scanned in said second scan pass.

13. The system of claim 12, wherein:
said condition is related to the labels of said plurality of spatially neighboring pixels to said unreliable pixel; and
said second condition is related to the labels of said second plurality of spatially neighboring pixels to said unreliable pixel.

14. The system of claim 12, wherein:
said plurality of spatially neighboring pixels is associated with a four-nearest-neighbor neighborhood in relation to said unreliable pixel; and
said second plurality of spatially neighboring pixels is associated with a second four-nearest-neighbor neighborhood in relation to said unreliable pixel.

* * * * *